United States Patent Office 3,684,737
Patented Aug. 15, 1972

3,684,737
COATING COMPOSITION FOR INDICATING
STERILIZATION
John H. Emigh, Monrovia, Calif., assignor to
Mask-Off Company, Monrovia, Calif.
No Drawing. Filed Aug. 25, 1969, Ser. No. 852,946
Int. Cl. C09k 3/00; G01n 33/00
U.S. Cl. 252—408                                    6 Claims

ABSTRACT OF THE DISCLOSURE

Coating compositions for use in indicating sterilization by ethylene oxide, steam or dry heat are disclosed. These compositions include a halide salt of a metal selected from the group consisting of iron, cobalt and nickel, a pigment which will accentuate so as to make more easily visible any change in color resulting from reaction of such salt, and a binder material which will suspend and hold the salt and the pigment in proximity with one another.

BACKGROUND OF THE INVENTION

Frequently it is desired to utilize markings on packages, tapes, cards and the like which will indicate when various items have been sterilized. Compositions for this purpose have been developed and utilized. These prior compositions are considered to be of somewhat limited acceptability for various reasons.

Certain of these prior compositions utilize a colorless or essentially colorless salt which will react upon a specific type sterilization so as to result in a new compound of a different pH than the first. In such compositions a pH indicator is utilized so as to provide a visual indication of the reaction of the salt employed. This type of composition is considered to be acceptable for some purposes but it, like other compositions which merely change in color upon heating, are considered to have certain serious commercial drawbacks.

At the present time three different types of sterilization are commonly employed. One of these methods involves the treatment with ethylene oxide. Another involves autoclave treatment with steam at an elevated temperature. Sterilization by gamma radiation is also known. There is a commercial need for a sterilization indicator composition which will change color when subjected to any of these types of sterilization procedures. It is not considered that prior art compositions have satisfactorily supplied this need.

SUMMARY OF THE INVENTION

An objective of the present invention is to provide new and improved sterilization indicator compositions which adequately and satisfactorily supply this need. From this it will be apparent that an objective of this invention is to provide compositions which will visually indicate by color change when these compositions have been subjected to ethylene oxide, steam or dry heat sterilizing conditions.

Further objectives of this invention are to provide compositions as indicated; which may be easily and conveniently formulated using conventional equipment; which may be easily and conveniently applied as coatings by either conventional coating, printing or related procedures; which are effective after prolonged storage periods, even if subjected to adverse conditions which might alter the effectiveness of prior compositions, and which provide an easily detectable visual change indicating sterilization.

In accordance with this invention these and various other related objectives of this invention as will be more fully apparent from a detailed consideration of the remainder of this specification are achieved in a simple composition containing: a halide salt of a metal selected from a group consisting of iron, cobalt and nickel; an inert or substantially inert pigment which will accentuate so as to make more easily visible any change in color resulting from the reaction of such salt; and a binder material which will suspend and hold the salt and the pigment in proximity with one another in the composition.

Preferably the salt used is either a hydrate or the composition includes a limited amount of water held by the binder so that water is always available to enter into a reaction during sterilization. The composition of this invention as sold will normally include a solvent or solvent system serving to adjust its physical characteristics so that it may easily be applied to a surface by conventional coating, printing or similar techniques.

BRIEF DESCRIPTION OF THE PREFERRED EMBODIMENTS

A composition as described in the preceding in accordance with this invention should preferably contain from about 10 to about 80% by weight of the halide salt of a metal selected from the group consisting of iron, cobalt and nickel, from about 1 to about 15% by weight of the pigment used, and from about 80 to about 10% by weight of the binder employed. In order to facilitate application normally such a composition as supplied for use will contain an amount of a solvent or solvent system sufficient to adjust the viscosity of the composition to a value such that the composition may be readily applied using known techniques. The amount of such a solvent or solvent system employed will vary dependent upon the intended method of application.

It is principally preferred to utilize as the metal salt within the composition ferric bromide. It is further preferred to employ this salt as the hexahydrate since, when it is employed in this manner, the ultimate composition will contain some water so as to facilitate reactions which transpire on various types of sterilization. It is considered that utilizable results can also be achieved with ferric chloride, iodide and fluoride. The bromides, chlorides, iodides and fluorides of cobalt and nickel are also considered to be acceptable for use with the present invention. In order to provide available water for reaction purposes it is considered that hydrates of any of these salts used should be empolyed.

The pigment utilized in a composition of this invention may be any type of pigment which is inert or substantially inert in the composition itself. Because of the fact that various dyes such as are used as pH indicators are somewhat prone to degrade under ambient conditions, such as exposure to actinic radiation it is preferred not to utilize what may be classified as dye-type materials with the compositions of the present invention.

The pigment used for any specific application should be selected so as to have a color which will "accentuate" any change in the color resulting from reaction from any salt utilized. Thus, the pigment may be chosen so as to have a color which causes the entire initial composition to have a distinctly different appearance both before and after sterilization. The pigment may in effect "hide" the color of the initial metal salt in accentuating color changes.

It is presently preferred to utilize with the preferred salt ferric bromide a yellow pigment which imparts to the total composition a brownish-orange color. With such a preferred composition the entire composition will take on a tan or faun-like color upon ethylene exide sterilization, a yellow type of color upon steam autoclave convention sterilization, and a black or charcoal type color upon dry heat sterilization at a temperature in the neighborhood of 300 degrees F. Other different color combinations can be achieved through the use of different metal salts and differently colored pigments.

The binder utilized with compositions of this invention may be a conventional type of binder such as is commonly utilized in various coatings and printing ink compositions. This is because the binder is employed primarily as a mere physical holding agent for the metal salt and pigment used in a composition of this invention. However, the binder utilized should preferably be transparent or nearly transparent and relatively clear in a composition of this invention in order that the binder will not tend to mask or obscure the color of the metal salt and pigment employed. It is further considered preferable that the binder utilized be of an organic character so as to be capable of entering into reactions with the metal salt employed during certain types of sterilization such as sterilization in steam and in dry heat.

Suitable binders include ethyl cellulose, crylic resins such as are used for coating purposes, vinyl resins such as are used for coating purposes such as polyvinyl acetate. Such materials are not water soluble and only swell in water to a restricted extent. As a result of this when they are used as binders, the resultant compositions do not tend to come off of surfaces upon which they are located under conditions of high ambient humidity or the like. For this reason it is considered preferable to utilize this water insoluble type of binder instead of binders such as methylcellulose or polyvinyl alcohol which may be classified as essentially water soluble.

The content of the coating composition should be regulated by essentially physical and visual factors. The amount of the pigment utilized should be sufficient so as to clearly aid in making visible color changes in the iron salts used. If less than about 1 percent by weight of the pigment is used, it is considered that this result is not normally achieved. On the other hand if over 50 percent by weight of the pigment is used, it is considered that the pigment will tend to mask or obscure any color changes in the metal salt instead of tending to accentuate the visibility of such changes. This masking effect may also be encountered with lesser amounts of some pigments.

Similarly if too small a quantity of the metal salt is used, obviously the color changes which occur as result of reaction of this salt will not be readily visible. Thus, at least 10 percent by weight of the metal salt should be used. As opposed to this, if too great a proportion of the metal salt is present in the composition the very physical presence of the excess of the salt will tend to weaken the composition so as to affect its physical ability against abrasion or the like. Also, if an excess of the metal salt is employed it will tend to obscure any benefits to be achieved from the use of a pigment as described. For these reasons it is considered that the maximum of the salt used should be the 80 percent by weight figure given in the preceding.

The amount of the binder utilized is dependent primarily on the amount necessary to obtain a composition which can be satisfactorily applied by known coating or printing methods and which will provide in the ultimate composition adequate physical strength to be resistant to abrasion or the like. In general if too little binder material is employed—that is, less than the 10 percent by weight figure given—an ultimate composition as described will not be sufficiently strong to resist abrasion during handling and the like. As opposed to this in general, if the amount of binder used is over the 80 percent figure used, the metal salt and pigment disclosed in such method will be so "diluted" or separated so that an effective visual effect is not achieved. The precise amount of any specific binder required will depend upon the precise physical properties of such binder.

In formulating a coating composition as indicated in the preceding the ultimate ingredients of the composition are mixed with an appropriate solvent or solvent system which adjusts the viscosity of the composition to a desired value for any particular method of application. The amount of such a solvent or solvent system employed in formulating a particular composition will depend upon the physical proportions of the binder used, the physical properties of the solvent or solvent system and the viscosity necessary for the intended method of application of the composition. Thus, the amount of the solvent or solvent system will be less in a composition to be employed for coating by the doctor blade technique than if the composition is to be applied as a flexographic ink.

In general, the amount of solvent or solvent system to be employed in a specific composition can be easily determined by routine experimentation. The solvent or solvents used should be conventional organic solvents capable of being easily vaporized at moderate temperatures of up to about 150° F. Such solvents include methylethyl ketone, conventional denatured ethanol, toluene and the like. It is possible to formulate a solvent mixture of a composition of this invention using only water as the solvent when an appropriate binder capable of forming a water solution or dispersion is used.

Preferably the solvent or solvent system employed will include some water which will be "trapped" in the binder of the composition in the form of a hydrate of the metal salt used so that such water is available for reaction upon sterilization. The solvent system may also include conventional surfactants and viscosity adjustment agents. Such an agent may be a substance such as a finely divided silica. If desired it may include one or more compositions capable of acting as plasticizers for the binder employed, although this is not normally considered necessary.

In formulating a composition of this invention essentially conventional methods are utilized. Thus, the various ingredients may be mixed in conventional manner. It is presently preferred to mix the ingredients utilizing a high-speed dispersion mixture such as a Cowles mixer, so as to be assured that all of the ingredients are uniformly dispersed and finely enough divided so as to be capable of being easily applied. If desired the mixture created in accordance with this invention may be ball milled so as to make sure that the particles within it are broken up and are finely enough divided for easy application. It is considered that effective application requires that all particles present be at least −100 mesh standard Tyler screen size.

As an aid to understanding this invention, the following specific formulations are given. It is to be understood that many other similar formulations may be created through the use of routine formulary skill.

Example 1

A satisfactory coating composition in accordance with this invention can be created by blending together in a conventional mixer the following ingredients:

Methylethyl ketone—8 lbs. 13 ozs.
Tricresyl phosphate—57 grams
Ethyl alcohol (denatured #1, 95.5% by weight ethanol—338 grams
Toluene—520 grams
Ethylcellulose (N-300 "Ethocel" produced by the Hercules Chemical, Wilmington, Del.—818 grams
Finely divided silicone ("Cab-O-Sil" M-5 produced by Godfrey L. Cabot Inc., Boston, Mass.)—51 grams
Pigment paste—273 grams
Aqueous ferric bromide solution (containing 48.5% by weight ferric bromide, balance water)—862 grams The pigment paste referred to in the preceding was separately prepared and contained the following ingredients in the percentages by weight indicated:

| | Percent |
|---|---|
| Toluene | 14 |
| Trichlorethane | 23.2 |
| Ethyl alcohol (denatured #1, 95.5% by weight ethanol) | 32.5 |
| Toluidine yellow pigment (Y-T455D, E. I. du Pont de Nemours & Co., Wilmington, Del.) | 27.8 |
| Ethylcellulose (N-7 "Ethocel" Hercules Chemical Co., Wilmington, Del.). | |

The pigment paste referred in this example was made by mixing the ethyl cellulose and the solvents and then adding the pigment to form the paste using a high-speed dispersion mixer.

This particular composition is intended for application by standard coating methods using a knife coater.

Example 2

A satisfactory coating composition in accordance with this invention can be created by blending together in a mixer the ingredients indicated in Example 1 omitting the toluene (but not the toluene in the pigment paste).

Example 3

A satisfactory flexographic ink coating composition in accordance with this invention can be prepared by first preparing a separate pigment composition by ball milling together for a period of at least 16 hours the following ingredients:

| | Grams |
|---|---|
| Ethyl alcohol (denatured #1, 95.5% ethanol) | 1900 |
| Acrylic binder (Acryloid B-82, Rohm & Haas, Philadelphai, Pa.) | 100 |
| Non-ionic surfactant (Triton X100, Rohm & Haas, Philadelphia, Pa.) | 2 |
| Toluidine yellow pigment (as in Example 1) | 1314 |

The final coating composition in accordance with this example can then be created by blending together in a conventional mixer the following ingredients:

| | Grams |
|---|---|
| Acrylic binder (Acryloid B-82, Rohm & Haas, Philadelphia, Pa.) | 1387 |
| Ethyl alcohol (denatured #1, 95.5% ethanol) | 1192 |
| Aqueous ferric bromide solution (containing 48.5% by weight ferric bromide, balance water) | 840 |
| Pigment composition (as above) | 720 |

I claim:

1. A coating composition for indicating sterilization by ethylene oxide, steam or dry heat which includes:
   a mixture of a halide salt of a metal selected from the group consisting of iron, cobalt and nickel, a pigment which will accentuate any change in color resulting from a reaction of said salt, said pigment having a color which causes said compositon to have a different color appearance before and after sterilization said pigment being present in an amount which is effective to accentuate any change in color resulting from a reaction to said salt, and a transparent binder for said salt and said pigment, said binder being present in an amount sufficient to enable said composition to be sufficiently strong to resist abrasion without interference with the visualization of color changes within the composition.

2. A coating composition as claimed in claim 1 wherein: said salt is ferric bromide.

3. A coating composition as claimed in claim 1 wherein: said pigment is a yellow pigment which is inert in said composition.

4. A coating composition as claimed in claim 1 wherein:
   said composition contains 10 to 80% by weight of said salt, 1 to 50% by weight of said pigment and 80 to 10% by weight of said binder,
   said salt is ferric bromide,
   said pigment is a yellow pigment which is inert within said composition.

5. A coating composition as claimed in claim 4 including solvent means for controlling the viscosity of said composition.

6. A coating composition for indicating sterilization by ethylene oxide, steam or dry heat which includes:
   a mixture of a halide salt of a metal selected from the group consisting of iron, cobalt and nickel, a pigment which will accentuate any change in color resulting from a reaction of said salt, said pigment having a color which causes said compositon to have a different color appearance before and after sterilization said pigment being present in an amount which is effective to accentuate any change in color resulting from a reaction to said salt, and a transparent binder for said salt and said pigment, said binder being present in an amount sufficient to enable said composition to be sufficiently strong to resist abrasion without interference with the visualization of color changes within the composition,
   said composition containing 10 to 80% by weight of said salt, 1 to 15% by weight of said pigment and 80 to 10% by weight of said binder.

References Cited

UNITED STATES PATENTS

| | | | |
|---|---|---|---|
| 2,889,799 | 6/1959 | Korpman | 116—114 |
| 2,937,279 | 5/1960 | Artandi | 252—408 X |
| 2,998,306 | 8/1961 | Huyck | 23—254 |
| 3,078,182 | 2/1963 | Crone | 252—408 X |
| 3,098,751 | 7/1963 | Huyck | 252—408 X |
| 3,311,084 | 3/1967 | Edenbaum | 116—114 |

ROBERT F. BURNETT, Primary Examiner

M. E. McCAMISH, Assistant Examiner

U.S. Cl. X.R.

23—87, 230 R, 253 TP; 73—356; 116—114.20